US007007580B2

(12) United States Patent
Hilliard et al.

(10) Patent No.: US 7,007,580 B2
(45) Date of Patent: Mar. 7, 2006

(54) APPARATUS FOR REMOVABLY SECURING A CUTTING COMPONENT

(75) Inventors: Michael William Hilliard, Somersworth, NH (US); Jatinder Singh Sappal, Rochester, NH (US); Mark Anthony Wingate, New Durham, NH (US)

(73) Assignee: Goss International Americas, Inc., Dover, NH (US)

( * ) Notice: Subject to any disclaimer, the term of this patent is extended or adjusted under 35 U.S.C. 154(b) by 255 days.

(21) Appl. No.: 10/120,472

(22) Filed: Apr. 11, 2002

(65) Prior Publication Data

US 2003/0192415 A1 Oct. 16, 2003

(51) Int. Cl.
*B23D 25/12* (2006.01)
*B26D 7/20* (2006.01)

(52) U.S. Cl. ............................ 83/346; 83/348; 83/659; 83/698.41

(58) Field of Classification Search ............. 83/698.41, 83/343–348, 659
See application file for complete search history.

(56) References Cited

U.S. PATENT DOCUMENTS

| | | | | |
|---|---|---|---|---|
| 1,601,335 | A * | 9/1926 | Addison | 83/659 |
| 3,705,526 | A * | 12/1972 | Bishop | 83/698.41 |
| 3,793,918 | A * | 2/1974 | Huffman | 83/698.41 |
| 3,935,774 | A * | 2/1976 | Craddy | 83/348 |
| 4,068,694 | A * | 1/1978 | Schmidt et al. | 83/698.41 |
| 4,187,753 | A * | 2/1980 | Walde | 83/698.41 |
| 4,594,928 | A * | 6/1986 | Thomas et al. | 83/698.41 |
| 4,671,154 | A * | 6/1987 | Thomas et al. | 83/698.41 |
| 5,086,683 | A * | 2/1992 | Steidinger | 83/346 |
| 5,159,868 | A * | 11/1992 | Thomas et al. | 83/346 |
| 5,224,408 | A * | 7/1993 | Steidinger | 83/346 |
| 5,259,283 | A | 11/1993 | Michalik | 83/347 |
| 5,755,654 | A * | 5/1998 | Schulz et al. | 83/345 |
| 5,890,410 | A * | 4/1999 | Hinojosa | 83/698.41 |
| 6,279,444 | B1 * | 8/2001 | Kellner et al. | 83/698.41 |

FOREIGN PATENT DOCUMENTS

| | | |
|---|---|---|
| EP | 1136411 | 9/2001 |

* cited by examiner

*Primary Examiner*—Allan N. Shoap
*Assistant Examiner*—Jason Prone
(74) *Attorney, Agent, or Firm*—Davidson, Davidson & Kappel, LLC

(57) ABSTRACT

An apparatus for removably securing a cutting component on a cutting component cylinder of a web printing press includes a first axial anvil member disposed at a periphery of the cutting component cylinder and a second axial anvil member disposed at the periphery of the cutting component cylinder opposite the first anvil member. The first and second anvil members receive the cutting component between them. A locking device is provided for positively securing the cutting component on the cutting component cylinder in a lock mode and positively releasing the cutting component in a release mode.

10 Claims, 9 Drawing Sheets

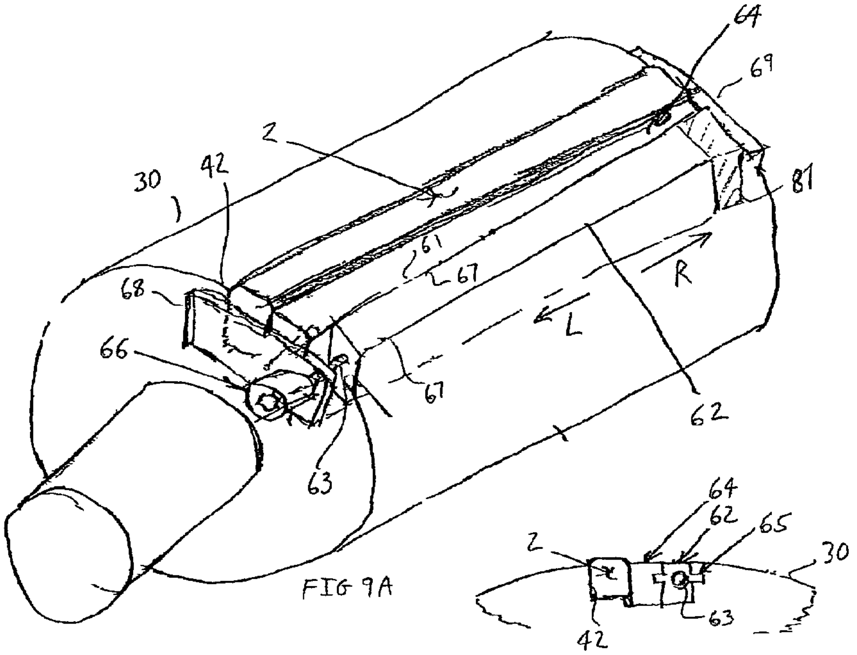
FIG 9A
FIG. 9B
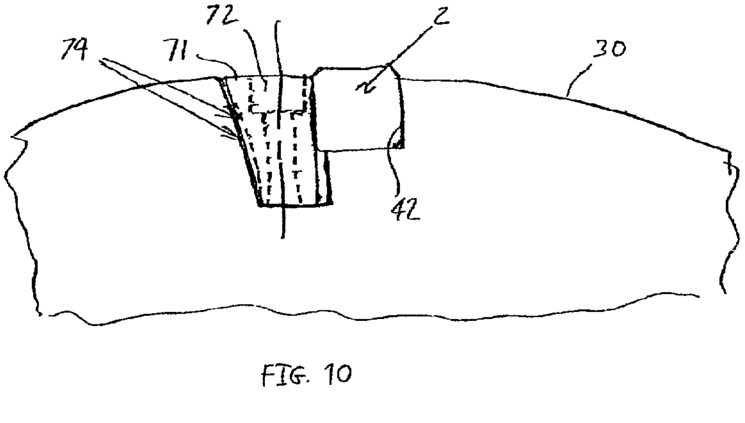
FIG. 10

APPARATUS FOR REMOVABLY SECURING A CUTTING COMPONENT

BACKGROUND

The present invention relates generally to web printing presses, and in particular to securing a cutting component on a cylinder of a folder in a web printing press.

Web printing presses print a continuous web of material, such as paper. The continuous web then is cut in a cutting unit of a folder so as to form signatures which can then be folded or output. The web is typically cut at the nip formed by a knife cylinder and an anvil cylinder by a blade carried by the knife cylinder in cooperation with a cutting rubber or other assembly carried by the anvil cylinder.

European Patent Application No. EP 1 136 411 A2 (which corresponds to commonly-owned U.S. patent application Ser. No. 09/533,685, which U.S. application is herewith incorporated by reference herein) discloses a folding apparatus having first cutting and anvil cylinders which partially cut a web so as to form first cuts. The partially cut web is guided between transport tapes to second cutting and anvil cylinders, which cut the web between the first cuts so as to form signatures. The transport tapes pass through axially-spaced grooves in the second cutting and anvil cylinders (see FIGS. 6 and 7).

U.S. Pat. No. 5,259,283 describes a crosscutting device for a folder assembly. A cutting groove cylinder includes a groove strip assembly having a cutting groove component and a pressure spring component for absorbing forces generated during the cutting process. The pressure spring component may be a resilient element (see FIGS. 1 and 3), or a brass body biased toward the cutting groove component by a pressure spring (see FIG. 2). The groove strip assembly is tightly enclosed in a groove in the cutting groove cylinder and has the disadvantage that it is not easily removable.

The blade and cutting rubber wear and must be periodically replaced. With typical prior devices, the blade replacement process is often time consuming and difficult, requiring loosening and tightening of bolts, screws, etc. The cutting rubber may be tightly held under compression in an axial groove machined in the anvil cylinder. Heretofore, replacement of the old cutting rubber has required prying the cutting rubber out of the axial groove with a tool, and then simultaneously bending and tapping the new cutting rubber into the axial groove in the anvil cylinder. For the system disclosed in European Patent Application No. EP 1 136 411 A2, it has proven difficult to properly align grooves formed in the cutting rubber with the axially-spaced tape grooves formed in the cylinder body using the bending and tapping method of inserting the cutting rubber. Often the cutting rubber has be removed and realigned, which may result in damage to the cutting rubber.

In some prior systems, the cutting rubber or blade is housed in an assembly which is removable from the cutting or anvil cylinder. The Quick Set Bar™ of EMT International, for example, purports to be a perforation bar which permits a blade carried by the bar to be quickly and easily changed. However, the entire bar, which includes the anvils between which the blade is clamped, must be removed from the cutting cylinder. There is no teaching to remove the blade alone.

SUMMARY OF THE INVENTION

The present invention provides an apparatus for removably securing a cutting component on a cutting component cylinder of a web printing press. The apparatus includes a first axial anvil member disposed at a periphery of the cutting component cylinder and a second axial anvil member disposed at the periphery of the cutting component cylinder opposite the first anvil member. The first and second anvil members are configured for receiving the cutting component between them. A locking device is provided for positively securing the cutting component on the cutting component cylinder in a lock mode and positively releasing the cutting component in a release mode.

The first and second anvil members may be configured for clamping the cutting component therebetween in the lock mode. The first anvil member may be fixed relative to the cutting component cylinder. The second anvil member may be movable relative to the first anvil member. Moreover, the second anvil member may be configured for pivoting about a pivot axis fixed relative to the cutting component cylinder.

The locking device may include a turnable eccentric member configured for urging at least a portion of the second anvil member toward the first anvil member so as to achieve the lock mode in a first angular position of the eccentric member and to achieve the release mode in a second angular position of the eccentric member. The lock-mode is at an over-toggle position, which provides a positive locking in the lock mode. The eccentric member may be an elongated axial member disposed adjacent to the second anvil member. Moreover, the eccentric member may be an eccentric disc received in a slot defined by the second anvil member.

Moreover, the locking device may include a turnable eccentric member configured for urging at least a portion of the second anvil member toward the first anvil member so as to achieve the lock mode in a first angular position of the eccentric member, for further urging at least the portion of the second anvil member toward the first anvil member in a second angular over-toggle position of the eccentric member so as to provide a positive-locking in the lock mode, and for permitting at least the portion of the second anvil member to move away from the first anvil member so as to achieve the release mode in a third angular position of the eccentric member.

The second anvil member may have a first tapered surface facing opposite the first anvil member. A taper member may be provided having a second tapered surface disposed adjacent the first tapered surface and configured for translating in an axial direction so as to urge the second anvil member toward the first anvil member in the lock mode.

The cutting component cylinder may define a groove having a tapered axial side and the second anvil member may have a tapered surface facing opposite the first anvil member. The second anvil member may be received in the groove with the tapered surface adjacent the tapered axial side and movable in an inwardly radial direction so as to urge the second anvil member toward the first anvil member in the lock mode.

At least one of the first and second anvil members may be fixedly attached to the cutting component cylinder. At least one of the first and second anvil members may be integrally formed with the cutting component cylinder.

The locking device may include an inflatable seal device configured for inflating so as to urge the second anvil member toward the first anvil member so as to achieve the clamping in the lock mode. The inflatable seal device may be further configured for deflating so as to permit the second anvil member to move away from the first anvil member so as to achieve the release mode. Moreover, the locking device may include a vacuum device configured for applying a vacuum adjacent to at least one surface of the cutting component so as to urge the cutting component in a radially inward direction so as to achieve the lock mode.

The locking device may include an elongated capture member received in a longitudinal bore defined by the cutting component, as well as a first and a second spring clip member configured for removably attaching the capture member to the cutting component cylinder at respective ends of the capture member. Moreover, the locking device may include a removable clip device received in a transverse groove defined by the cutting component and configured for fixedly attaching the cutting component to the cutting component cylinder so as to achieve the lock mode and for being removed so as to achieve the release mode.

The cutting component cylinder may be an anvil cylinder and the cutting component may be a cutting rubber. Moreover, the cutting component cylinder may be a cutting cylinder and the cutting component may be a cutting blade.

The present invention also provides a web printing press. The web printing press includes a first axial anvil member disposed at a periphery of a cutting component cylinder of the web printing press and fixed relative to the cutting component cylinder, and a second axial anvil member disposed at the periphery of the cutting component cylinder opposite the first anvil member and configured for pivoting about a pivot fixed relative to the cutting component cylinder. The first and second anvil members define an axial groove configured for receiving a cutting component. A turnable eccentric member is provided for urging at least a portion of the second anvil member toward the first anvil member so as to clamp the cutting component between the first and second anvil members in a first angular position of the eccentric member, and for permitting at least the portion of the second anvil member to move away from the first anvil member so as to release the cutting component in a second angular position of the eccentric member. Between the first and second angular positions, the first and second anvil members may be urged further together by the eccentric member so that the first position defines an over-toggle position.

The present invention provides a positive locking and positive quick-release capability which enables a cutting rubber or other cutting component on a cylinder of a folder to be replaced or adjusted quickly, accurately and reliably without undue operator subjectivity.

BRIEF DESCRIPTION OF THE DRAWINGS

The present invention is elaborated upon below based on exemplary embodiments with reference to the accompanying drawing.

FIG. 9A shows a perspective view of an apparatus according to still another embodiment of the present invention using taper bar members.

FIG. 9B shows a cross-sectional side view of the apparatus shown in FIG. 9A.

FIG. 10 shows a schematic cross-sectional view of yet another embodiment of the present invention using a wedge member.

DETAILED DESCRIPTION

Figure 1:
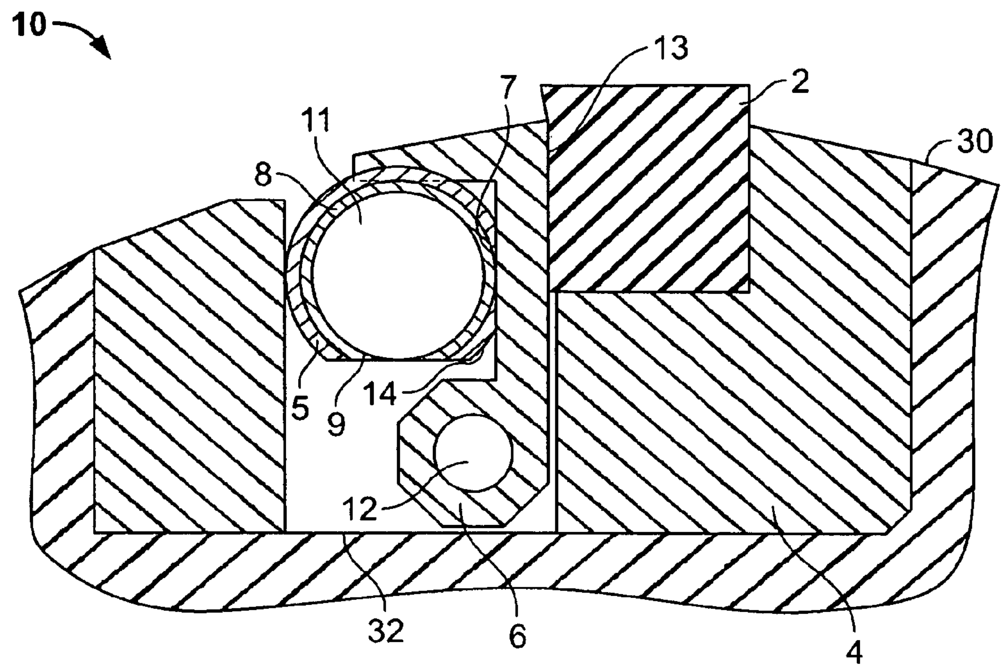
FIG. 1 shows a cross-sectional schematic view of an apparatus for removably securing a cutting component on a cutting component cylinder according to an embodiment of the present invention, in a lock mode.

Referring to FIGS. 1–4, an embodiment of an apparatus according to the present invention for securing a cutting component on a cutting component cylinder. In the embodiment shown securing apparatus 10 includes fixed anvil 4, movable anvil 6, and locking rod 8 for securing cutting rubber 2 on anvil cylinder 30. Cutting rubber 2 may be made of a suitable resilient material, such as polyurethane, for example. In other embodiments of the present invention, another cutting component, such as a cutting groove or a cutting blade, for example, may be secured on an anvil cylinder or a knife cylinder, or other cylinder, of a folder apparatus. Locking rod 8 enables apparatus 10 to assume a lock mode, in which cutting rubber 2 is secured, or fixed, on anvil cylinder 30, and a release mode, in which cutting rubber 2 is easily removable from anvil cylinder 30.

Figure 2:
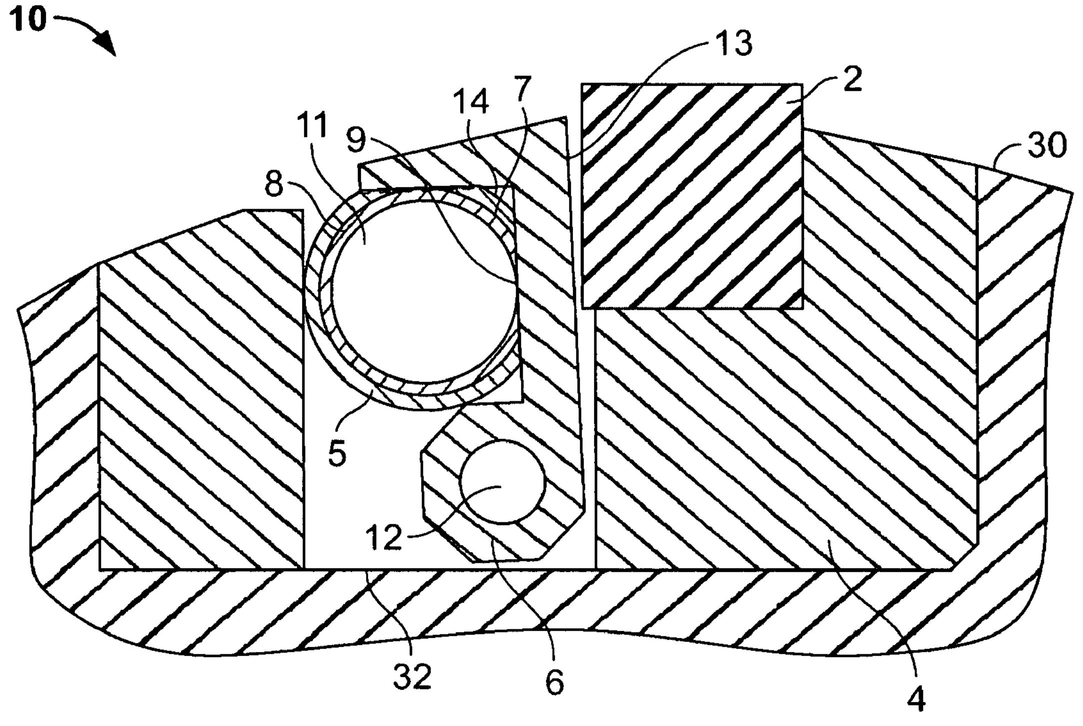
FIG. 2 shows a cross-sectional schematic view of the apparatus of FIG. 1 in a release mode.

Movable anvil 6 pivots about a pivot axis 12 so as to enable anvil 6 to assume the lock mode, as shown in FIG. 1, or the release mode, as shown in FIG. 2. In the lock mode, cutting component 2 is clamped between movable anvil 6 and fixed anvil 4. In the release mode, movable anvil 6 is rotated away from fixed anvil 4 so as to unclamp cutting component 2 from between the anvils. The lock mode is a condition in which cutting rubber 2 is positively secured on anvil cylinder 30, whereas the release mode is a condition in which the cutting rubber is positively unsecured from anvil cylinder 30 so as to permit easy repositioning or removal of the cutting rubber.

Figure 1A:
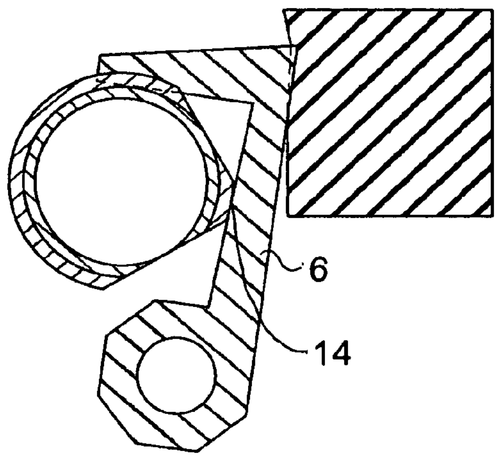
FIG. 1A shows the anvil between the FIG. 1 and FIG. 2 positions.

Locking rod 8 may be a generally cylindrical rod element having eccentric, or cam, members 5 and capable of being rotated, or turned, about pivot axis 11 so as to rotate eccentric members 5 into two angular positions 90° relative to each other. Eccentric members 5 each include a face 7, a face 9, and a face 14. Face 7 is a further radial distance from pivot axis 11 than face 9 is, while face 14 is still a further radial distance from pivot axis 11 than face 7 is. When locking rod 8 is positioned as shown in FIG. 1, face 7 is located adjacent movable anvil 6 with surface 13 of movable anvil 6 abutting cutting rubber 2 so as to force the cutting rubber against fixed anvil 4. In this, the lock, mode of locking rod 8, cutting rubber 2 is positively clamped, or locked, between surface 13 of movable anvil 6 and fixed anvil 4. Surface 13 of movable anvil 6 may be rough or jagged, as through plasma spray roughening, so as to enhance the gripping effect of movable anvil 6 on cutting rubber 2. When locking rod 8 is rotated as shown in FIG. 2 (90° from the position shown in FIG. 1), face 9 is located adjacent to movable anvil 6 so as to permit the movable anvil to move in a direction away from fixed anvil 4. In this, the release, mode, cutting rubber 2 is easily removable from anvil cylinder 30. As locking rod 8 is rotated between the lock and release modes, securing apparatus 10 transitions through an "over-toggle" position, as shown in FIG. 1A, in which face 14 is located adjacent to movable anvil 6. This over-toggle position provides a positive-locking effect so that locking rod 8 is either in the release mode or positively in the lock mode.

Thus, a 90° rotation of locking rod 8 changes apparatus 10 quickly from the positive lock mode to the positive release mode. No subjective operator judgement regarding torque loading of bolts, screws, etc., is required. The apparatus is positively in the lock or the release mode. Changing from the lock to the release mode may be performed expeditiously, in a "quick-release" manner. Cutting rubber 2 is uniformly loaded, or held, along its entire length, or a large portion thereof, closely approximating the rigidity that would be provided by a groove machined into anvil cylinder 30 for securing the cutting rubber. The present invention permits cutting rubber 2 to be easily and accurately positioned relative to anvil cylinder 30 with little or no damage to the cutting rubber. Thus, in folder systems utilizing transport tapes passing through axially-spaced grooves in anvil cylinder 30, cutting rubber 2 may be easily positioned so that corresponding grooves in the cutting rubber are aligned with the anvil cylinder grooves. Additionally, cutting rubber 2 may be easily released It should be note that angular differences other than 90° may be provided between the lock mode and release mode positions of locking rod 8, depending on the particular configuration of eccentric members 5.

Figure 3:
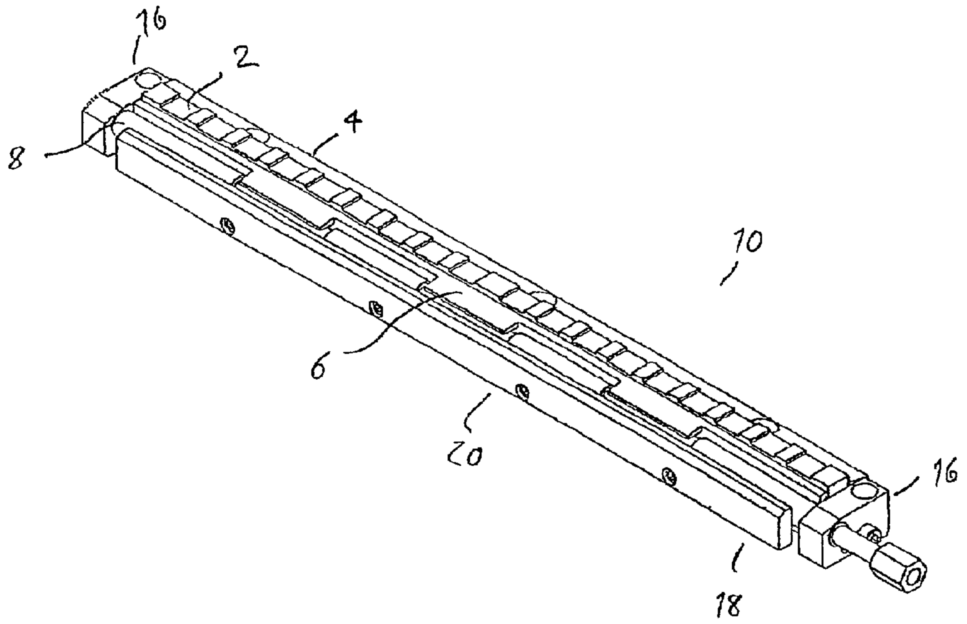
FIG. 3 shows a perspective view of the apparatus of FIG. 1.
Figure 4:
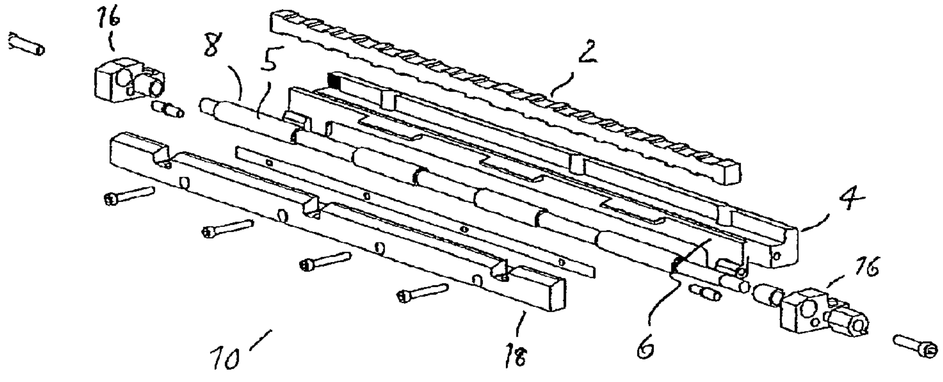
FIG. 4 shows an exploded perspective view of the apparatus of FIG. 1

With specific reference to FIGS. 3 and 4, an embodiment of the apparatus according to the present invention includes side member 18 and end caps 16. Movable anvil 6 and locking rod 8 pivot on, and are supported by, end caps 16. Together with fixed anvil 4, side member 18 and end caps 16 form a unitary assembly 20. Unitary assembly 20 may be affixed in channel 32 in anvil cylinder 30, using bolts, for example. Unitary assembly 20 may be factory-adjusted, as for the height, alignment, etc., of cutting rubber 2, as well as for the force and action of locking rod 8 and movable anvil 6. In other embodiments of the present invention, fixed anvil 4 may be an integral part of anvil cylinder 30, with movable anvil 6 and locking rod 8 pivoting about respective axes on anvil cylinder 30, for example.

Figure 5A:
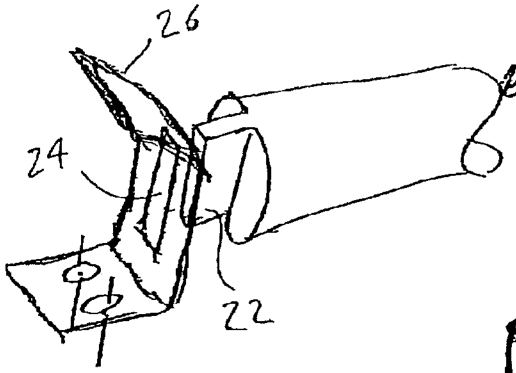
FIGS. 5A and 5B show perspective views of devices for positively holding in place the locking rod according to respective embodiments of the present invention.
Figure 5B:
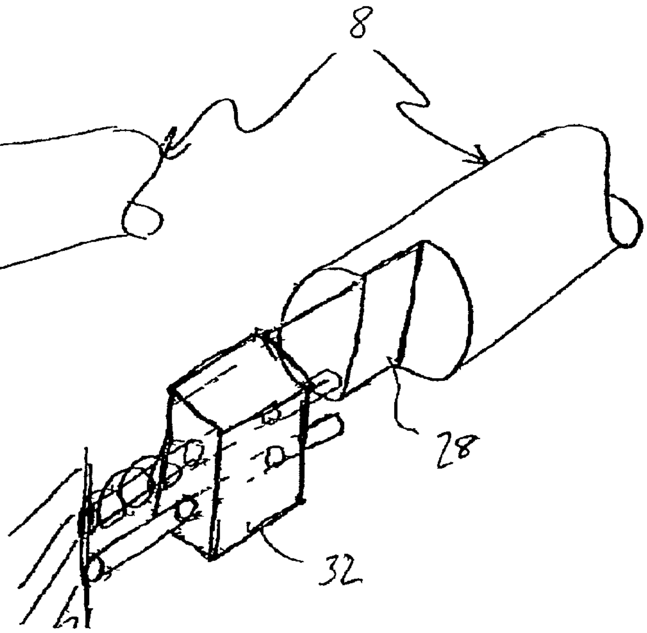

FIGS. 5A and 5B show devices for holding in place the locking rod according to respective embodiments of the present invention. The embodiments shown in FIGS. 5A and 5B may each provide a positive locking effect in a different respective way to the embodiment discussed above with reference to FIGS. 1–4. As such, in the embodiments shown in FIGS. 5A and 5B, locking rod 8 may or may not include surface 14 for over-toggle positive locking, as described above. In the embodiment shown in FIG. 5A, locking rod 8 is provided with tab 22 at an end of the rod thereof. Tab 22 may be inserted into slot 24 of clip device 26 so as to hold locking rod 8 in securely in the lock mode, locking rod 8 being prevented from rotating out of the lock mode by clip device 26. As discussed above, in the lock mode, cutting rubber 2 is clamped between movable anvil 6 and fixed anvil 4. Clip device 26 may be spring loaded to permit it to be easily disengaged from locking rod 8 so that the locking rod may be rotated to the release mode in which cutting rubber 2 is unclamped from anvils 6 and 4. In other embodiments of the present invention, clip device may be fixed in place using bolts, for example.

In the embodiment shown in FIG. 5B, locking rod 8 is provided with cutout 28, which is designed to mate with sprung block 32 so as to prevent rotation of the locking rod and hold it in the lock mode, as with the embodiment shown in FIG. 5A. Sprung block 32 may be retracted against spring force out of engagement with locking rod 8 so as to permit locking rod 8 to be rotated into the release mode.

Figure 6:
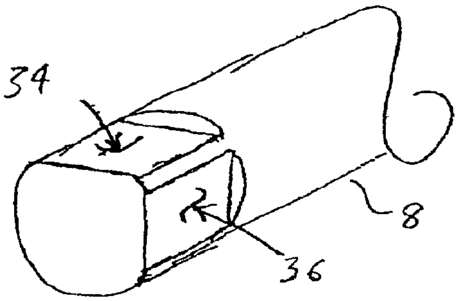
FIG. 6 shows a perspective view of a locking rod having a position indicating device according to an embodiment of the present invention.

FIG. 6 shows an embodiment of the present invention in which locking rod 8 is provided with flattened surfaces 34 and 36 for indicating to an operator the position of the locking rod. When surface 34 is facing upward, as shown in FIG. 6, locking rod 8 is in the lock mode. Whereas when locking rod 8 is rotated 90° such that surface 36 is facing upward, then locking rod 8 is in the release mode. Surfaces 34 and 36 may be painted red and green, respectively, for example, to provide a simple, effective position indication of locking rod 8.

Figure 7A:
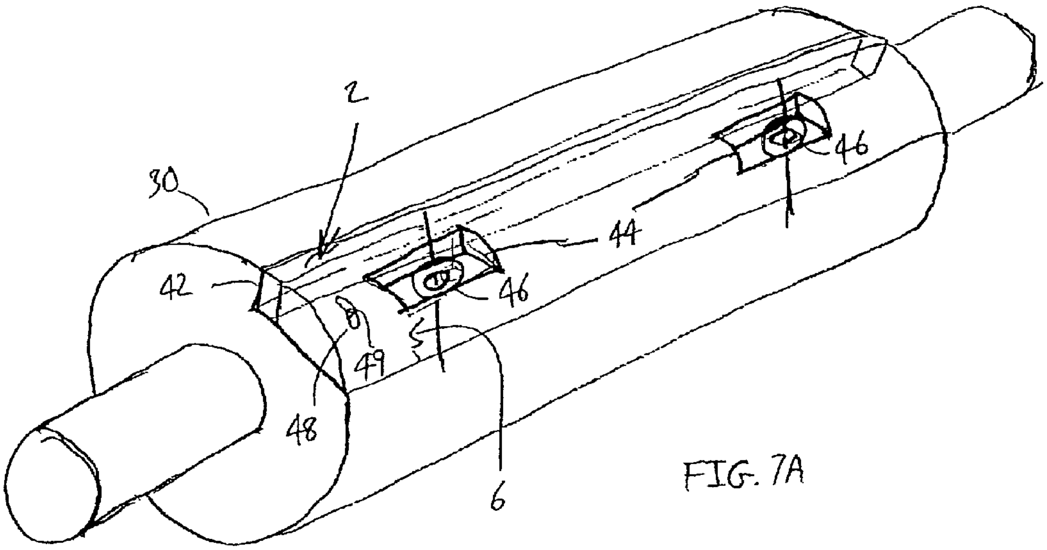
FIG. 7A shows a perspective view of an apparatus according to another embodiment of the present invention using eccentric disc members in cutouts of the movable anvil.
Figure 7B:
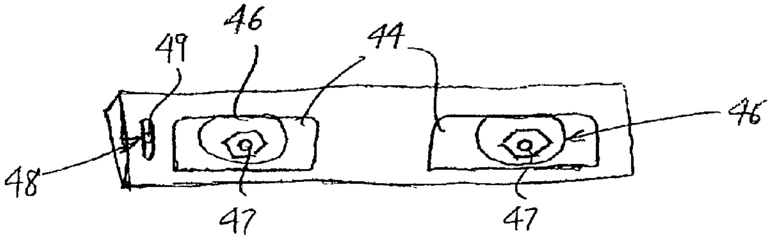
FIG. 7B shows a perspective detail view of the movable anvil portion of the apparatus shown in FIG. 7A.

Referring now to FIGS. 7A and 7B, another embodiment of the present invention is depicted. In the lock mode as shown, cutting rubber 2 is clamped between movable anvil 6 and surface 42 of anvil cylinder 30. In other embodiments of the present invention, surface 42 may be included in a separate fixed anvil which is, for example, bolted to anvil cylinder 30. Eccentric disc, or cam, members 46 are located in cutouts 44 in movable anvil 6 and are rotatable about respective pivots 47 fixed on anvil cylinder 30. Similar to eccentric members 5, discussed above with reference to FIGS. 1–4, eccentric discs 46 may be rotated about respective axes 47 to achieve the lock mode and the release mode. In the lock mode depicted, movable anvil 6 is forced against cutting rubber 2 so as to clamp the cutting rubber against surface 42 of anvil cylinder 30. In release mode, movable anvil 6 is withdrawn from cutting rubber 2 so that the cutting rubber is unclamped from between anvils 4 and 6 and free to be removed. A slot 48 in anvil 6 can interact with a pin 49 to limit axial movement.

Figure 8:
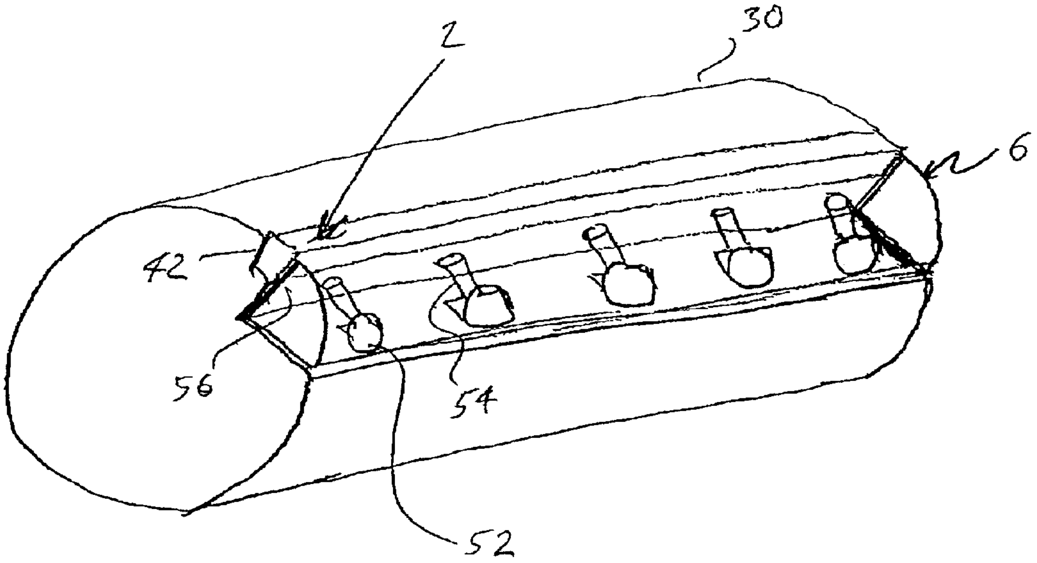
FIG. 8 shows a perspective view of an apparatus according to yet another embodiment of the present invention using tensile bolt members.

FIG. 8 shows an embodiment of the present invention in which tensile bolt members 52 are used to provide the clamping force to secure cutting rubber 2 between movable anvil 6 and surface 42 of anvil cylinder 30 to achieve the lock mode as shown. Tensile bolt members are located in respective bores 54 in movable anvil 6 and are anchored in surface 56 of anvil cylinder 30. By tightening tensile bolt members 52, movable anvil 6 is moved toward surface 42 so as to place the apparatus in the lock mode. Tensile bolt members may be any suitable bolts for forcing movable anvil 6 toward surface 42, as would be understood by one of skill in the art. By loosening tensile bolt members 52, movable anvil 6 is moved away from surface 42 so as to place the apparatus in the release mode.

Referring now to FIGS. 9A and 9B, another embodiment of the present invention is depicted using taper bar members 62 and 64 to provide the clamping force to secure cutting rubber 2. Threaded rod 63 is received in a corresponding threaded bore 67 in movable taper bar member 62. Rotating rod 63 clockwise or counterclockwise using lockable bolt 66 causes movable taper bar member 62 to translate in the respective direction indicated by arrows L and R in FIG. 9A. When movable taper bar member 62 moves in direction L it forces stationary taper bar member 64 into cutting rubber 2 by the interaction of tapered side 70 of member 62 with corresponding tapered side 61 of stationary taper bar member 64. Cutting rubber is thereby clamped between surface 42 of anvil cylinder 30 and stationary taper bar member 64 in the lock mode. When movable taper bar member 62 moves in direction R it loosens stationary taper bar member 64 and unclamps cutting rubber 2 so as to achieve the release mode. Void 81 is provided to permit movement of movable taper bar member 62 in direction R. Stops 68 and 69, or other types of stop members, may be provided to limit the motion of movable taper bar member 62 and achieve positive lock and release modes, respectively. As shown in FIG. 9B, movable taper bar member 62 has tabs 65 which slide in corresponding respective slots in stationary taper bar member 64 and anvil cylinder 30 so as to retain the taper bar members in the anvil cylinder. Lockable bolt 66 may be locked to secure movable taper bar member 62 in the lock mode.

FIG. 10 shows an embodiment of the present invention in which wedge member 71 is used to secure cutting rubber 2. Wedge member 72 is a tapered bar which is forced radially inwardly under the action of bolt 72. Due to straight tapered or curved surface 74 of anvil cylinder 30, wedge member 72 applies force to cutting rubber 2 so as to clamp the cutting rubber against surface 42 of the anvil cylinder in the lock mode. By loosening bolt 72, wedge member 72 moves radially outwardly so as to relieve the force on cutting rubber 2 and achieve the release mode in which the cutting rubber is removable.

Figure 11:
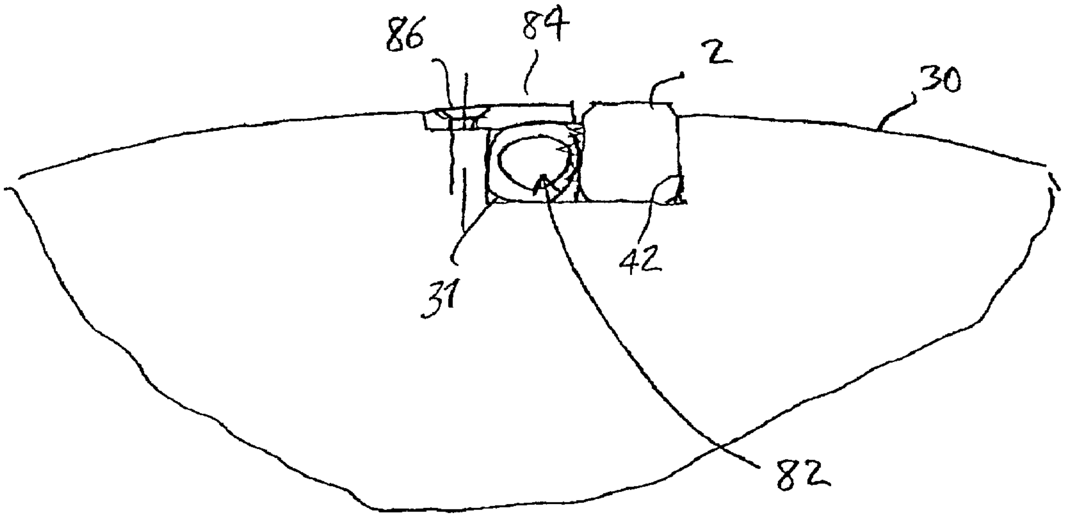
FIG. 11 shows a cross-section view of still another embodiment of the present invention using an inflatable seal.

Referring now to FIG. 11, in another embodiment of the present invention, inflatable seal 82 is used to clamp cutting rubber 2 in place. Inflatable seal 82 may be inflated using a fluid pressure source (not shown) to press cutting rubber 2 toward surface 42 of anvil cylinder 30 so as to achieve a lock mode with the cutting rubber firmly clamped between the inflatable seal and surface 42. Inflatable seal 82 may be deflated to achieve a release mode in which cutting rubber 2 is unclamped. Inflated and deflated presettings may be provided to achieve positive inflated and deflated positions of inflatable seal 82 for the lock and release modes. Cover plate 84, secured by bolt 86, is provided to enclose inflatable seal in groove 31 in anvil cylinder 30. Inflatable seal 82 may be any suitable inflatable seal device, such as a Seal Master™-brand inflatable seal.

Figure 12:
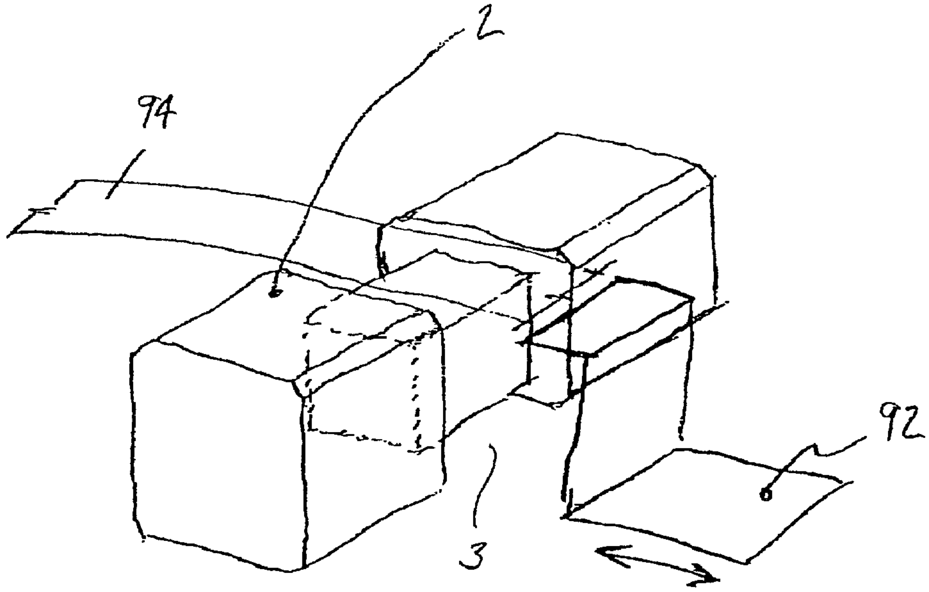
FIG. 12 shows a perspective exploded schematic view of yet another embodiment of the present invention using a keeper member.

FIG. 12 shows an embodiment of the present invention in which cutting rubber 2 is held in place using keeper member 92. Here, cutting rubber 2 includes axially spaced grooves 3, corresponding to respective grooves in the anvil cylinder (not shown). Grooves 3 provide clearance for one or more respective transport tapes 94, as in the folder apparatus disclosed in European Patent Application No. EP 1 136 411 A2, described above. Keeper member 92 fits in groove 3 and captures cutting rubber 2 on anvil cylinder 30 so as to achieve the lock mode. Keeper member 92 may be afixed to anvil cylinder 30 using screws, bolts, etc. Keeper member 92 may be removed to achieve the release mode. A plurality of keeper members 92 may be provided, spaced axially along cutting rubber 2 in respective grooves 3.

Figure 13:
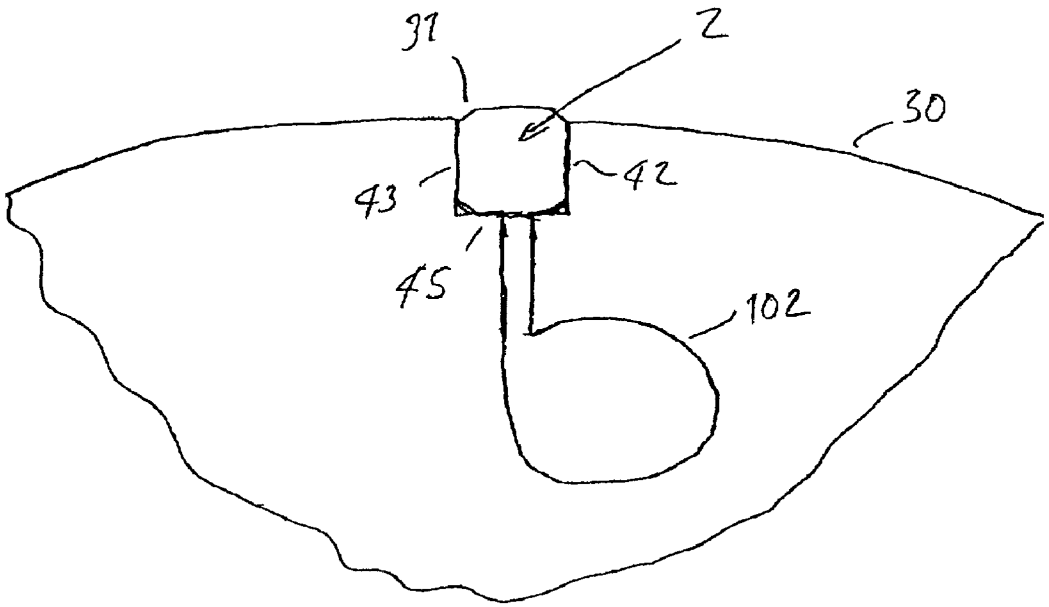
FIG. 13 shows a cross-sectional view of a still another embodiment of the present invention using a vacuum device.

Referring to FIG. 13, an embodiment of the present invention is shown in which cutting rubber 2 is secured in place in anvil cylinder 30 using vacuum device 102. Cutting rubber 2 is disposed in groove 31 in anvil cylinder 30. Vacuum device 102 draws a vacuum between cutting rubber 2 and one or more of bottom 45, side 42 and side 43 of groove 31, so as to hold the cutting rubber securely in groove 31 in the lock mode. Vacuum presettings may be provided to achieve positive vacuum and no-vacuum pressure levels for the lock and release modes. By removing the vacuum applied by vacuum device 102, the release mode may be achieved. Groove 31 may be, for example, machined in anvil cylinder 30. Vacuum device may be a vacuum pump or any suitable device for drawing a vacuum between cutting rubber 2 and groove 31.

Figure 14:
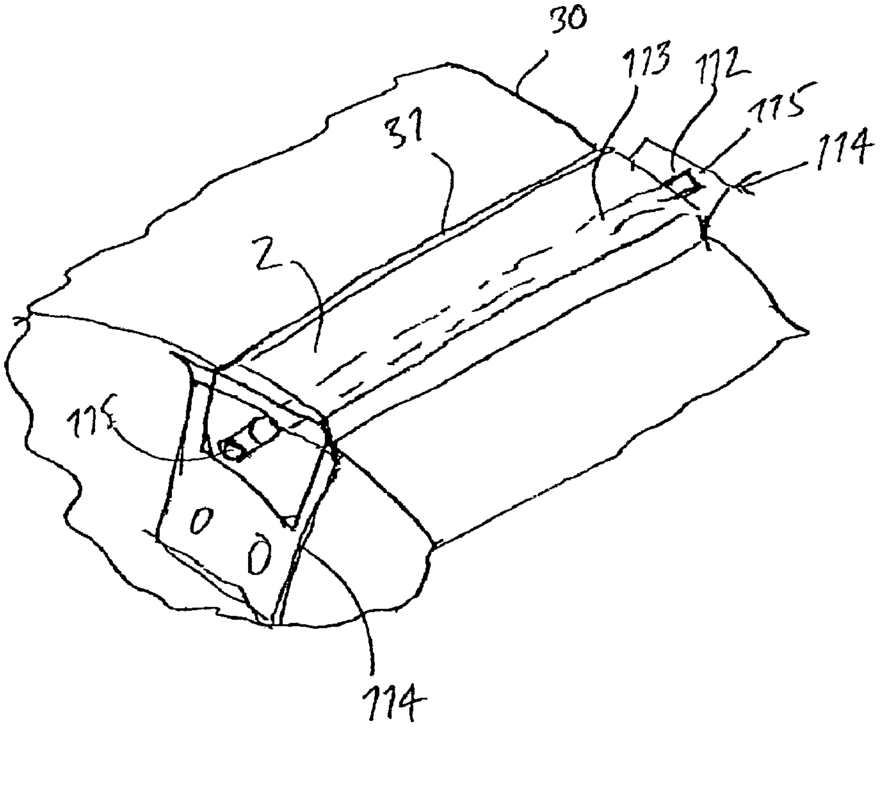
FIG. 14 shows a perspective schematic view of yet another embodiment of the present invention using spring clip devices.

Reference may now be had to FIG. 14, which shows an embodiment of the present invention in which cutting rubber 2 is secured to anvil cylinder 30 using rod 112 in conjunction with spring clips 114. Rod 112 is disposed in axial bore 113 in cutting rubber 2. Cutting rubber 2 is disposed in groove 31 in anvil cylinder 30. Ends 115 of rod 112 are secured in spring clips 114, as shown, so as to hold cutting rubber 2 securely in place in groove 31 and achieve the lock mode. Spring clips 114 are spring, or otherwise elastically, affixed to anvil cylinder 30 so that the spring clips may be retracted away from ends 115 and achieve the release mode.

It will of course be understood that the present invention has been described above only by way of example and that modifications of details can be made within the scope of the invention.

What is claimed is:

1. An apparatus for removably securing a cutting component on a cutting component cylinder of a web printing press, the apparatus comprising:

a first axial anvil member disposed at a periphery of the cutting component cylinder;

a second axial anvil member disposed at the periphery of the cutting component cylinder opposite the first anvil member, the first and second anvil members being configured for receiving the cutting component therebetween; and a locking device configured for positively securing the cutting component on the cutting component cylinder in a lock mode and positively releasing the cutting component in a release mode;

the first and second anvil members being configured for clamping the cutting component therebetween in the lock mode;

the locking device including a turnable eccentric member configured for urging at least a portion of the second anvil member toward the first anvil member so as to achieve the lock mode in a first angular position of the eccentric member and for permitting at least the portion of the second anvil member to move away from the first anvil member so as to achieve the release mode in a second angular position of the eccentric member;

wherein, in a third angular position of the eccentric member between the first and the second angular positions, at least the portion of the second anvil member is closer to the first anvil member than when the eccentric member is in the first angular position.

2. The apparatus as recited in claim 1 wherein the first anvil member is fixed relative to the cutting component cylinder.

3. The apparatus as recited in claim 1 wherein the eccentric member is an elongated axial member disposed adjacent to the second anvil member.

4. The apparatus as recited in claim 1 wherein the eccentric member is an eccentric disc received in a slot defined by the second anvil member.

5. The apparatus as recited in claim 1 wherein the cutting component cylinder is an anvil cylinder and the cutting component is a cutting rubber.

6. The apparatus as recited in claim 1 wherein the second anvil member is movable relative to the first anvil member.

7. The apparatus as recited in claim 6 wherein the second anvil member is configured for pivoting about a pivot axis fixed relative to the cutting component cylinder.

8. An apparatus for removably securing a cutting component on a cutting component cylinder of a web printing press, the apparatus comprising:

a first axial anvil member disposed at a periphery of the cutting component cylinder;

a second axial anvil member disposed at the periphery of the cutting component cylinder opposite the first anvil member, the first and second anvil members being configured for receiving the cutting component therebetween; and a locking device configured for positively securing the cutting component on the cutting component cylinder in a lock mode and positively releasing the cutting component in a release mode; the first and second anvil members being configured for clamping the cutting component therebetween in the lock mode; wherein the locking device includes a turnable eccentric member configured for urging at least a portion of the second anvil member toward the first anvil member so as to achieve the lock mode in a first angular position of the eccentric member and for permitting at least the portion of the second anvil member to move away from the first anvil member so as to achieve the release mode in a second angular position of the eccentric member, and at least one of a tab-and-slotted clip device and a cutout-and-sprung block device for positively holding the eccentric member in at least the lock mode;

wherein, in a third angular position of the eccentric member between the first and the second angular positions, at least the portion of the second anvil member is closer to the first anvil member than when the eccentric member is in the first angular position.

9. A web printing press comprising:

a first axial anvil member disposed at a periphery of a cutting component cylinder of the printing press and fixed relative to the cutting component cylinder;

a second axial anvil member disposed at the periphery of the cutting component cylinder opposite the first anvil member and configured for pivoting about a pivot fixed relative to the cutting component cylinder, the first and second anvil members defining an axial groove configured for receiving a cutting component; and a turnable eccentric member configured for urging at least a portion of the second anvil member toward the first anvil member so as to clamp the cutting component between the first and second anvil members in a first angular position of the eccentric member, and for permitting at least the portion of the second anvil member to move away from the first anvil member so as to release the cutting component in a angular position of the eccentric member, the first angular position being an over-toggle position.

10. An apparatus for removably securing a cutting component on a cutting component cylinder of a web printing press, the apparatus comprising:

a first axial anvil member disposed at a periphery of the cutting component cylinder;

a second axial anvil member disposed at the periphery of the cutting component cylinder opposite the first anvil member, the first and second anvil members being configured for receiving the cutting component therebetween; and a locking device configured for positively securing the cutting component on the cutting component cylinder in a lock mode and positively releasing the cutting component in a release mode;

the first and second anvil members being configured for clamping the cutting component therebetween in the lock mode, the second anvil member being movable relative to the first anvil member, and the second anvil member being configured for pivoting about a pivot axis fixed relative to the cutting component cylinder so as to move at least a portion of the second anvil member toward the first anvil member and achieve the lock mode in a first angular position of the second anvil member and so as to achieve the release mode in a second angular position of the second anvil member;

wherein, in a third angular position of the second anvil member between the first and the second angular positions, at least the portion of the second anvil member is closer to the first anvil member than when the second anvil member is in the first angular position.

* * * * *

UNITED STATES PATENT AND TRADEMARK OFFICE

CERTIFICATE OF CORRECTION

PATENT NO. : 7,007,580 B2 
APPLICATION NO. : 10/120472
DATED : March 7, 2006
INVENTOR(S) : Hilliard et al.

It is certified that error appears in the above-identified patent and that said Letters Patent is hereby corrected as shown below:

Please delete the old drawings that are illustrated below and insert the new drawings that are also illustrated that are attached.

Signed and Sealed this

Twenty-eighth Day of April, 2009

JOHN DOLL
*Acting Director of the United States Patent and Trademark Office*

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 3 should be deleted:

"

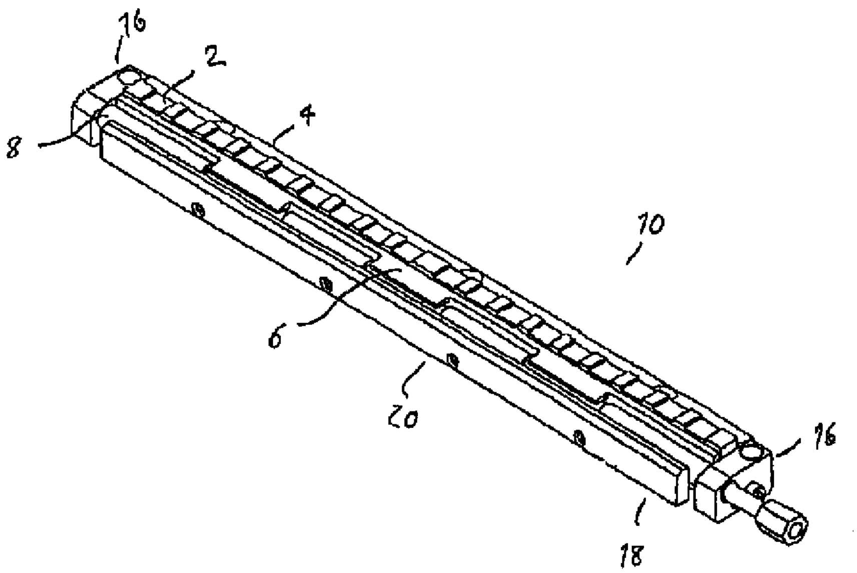

FIG. 3

"

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 3 should be replaced with the following:

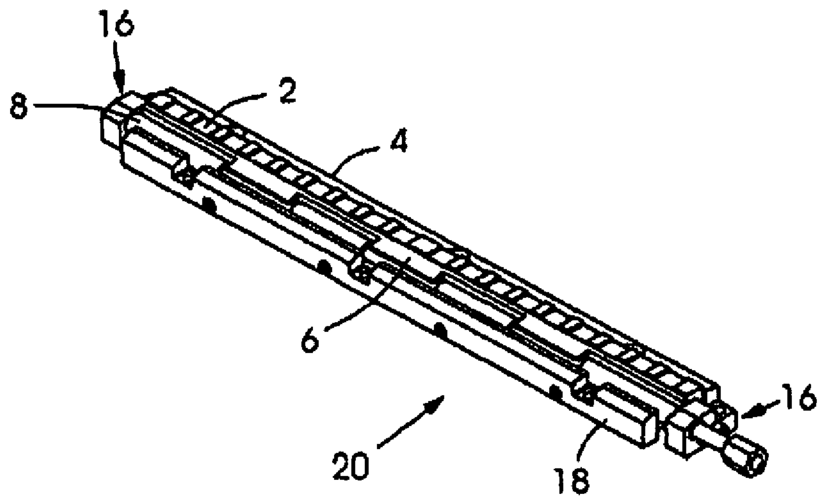

Fig.3

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 4 should be deleted:

“ 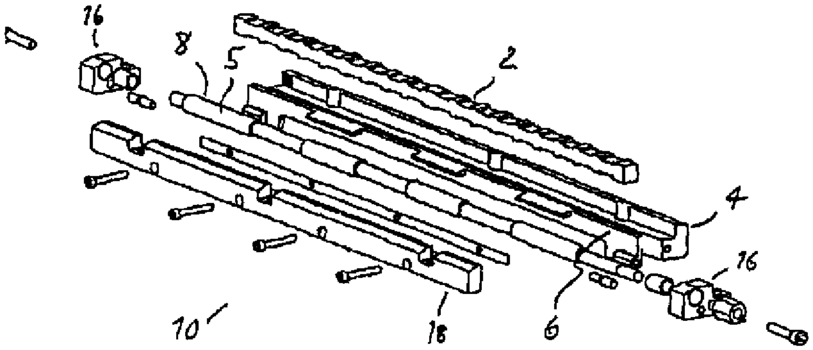 ”

FIG. 4

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 4 should be replaced with the following:

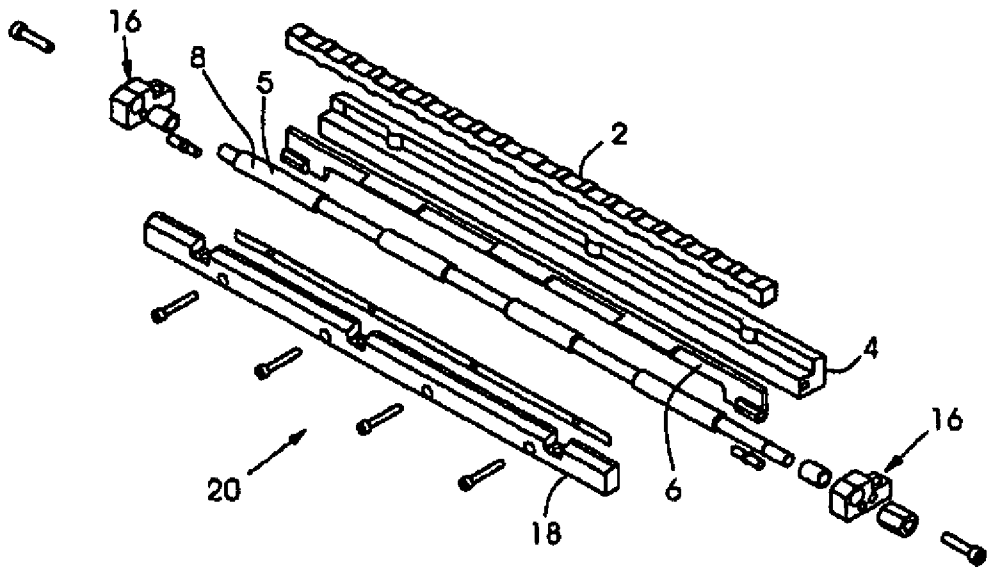

Fig.4

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figures 5a and 5b should be deleted:

“

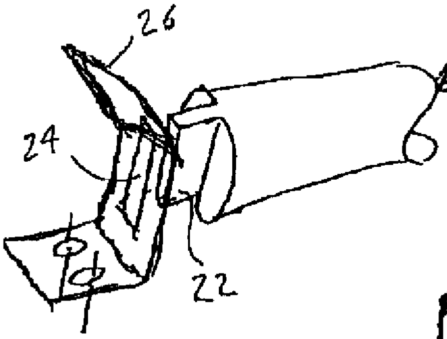

FIG. 5A

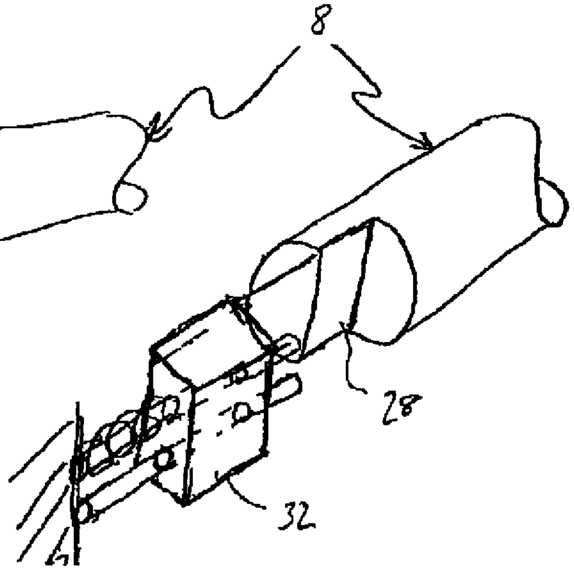

FIG. 5B

”

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figures 5a and 5b should be replaced with the following:

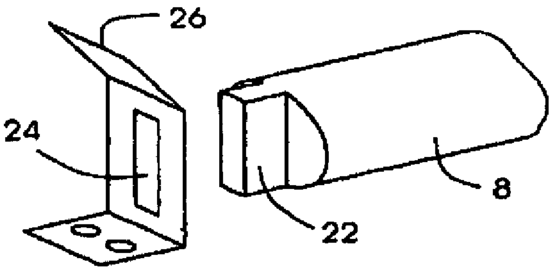

Fig.5a

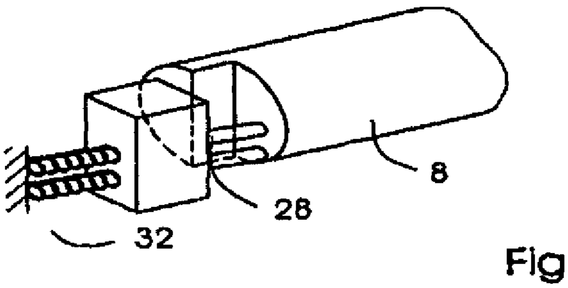

Fig.5b

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 6 should be deleted:

"

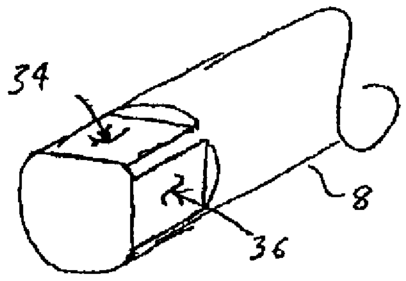

"

FIG. 6

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 6 should be replaced with the following:

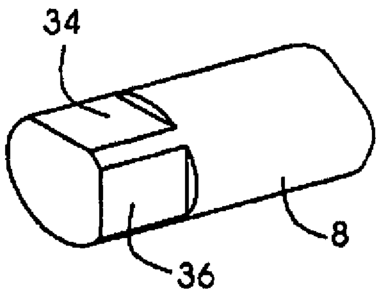

Fig.6

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 7a should be deleted:

"

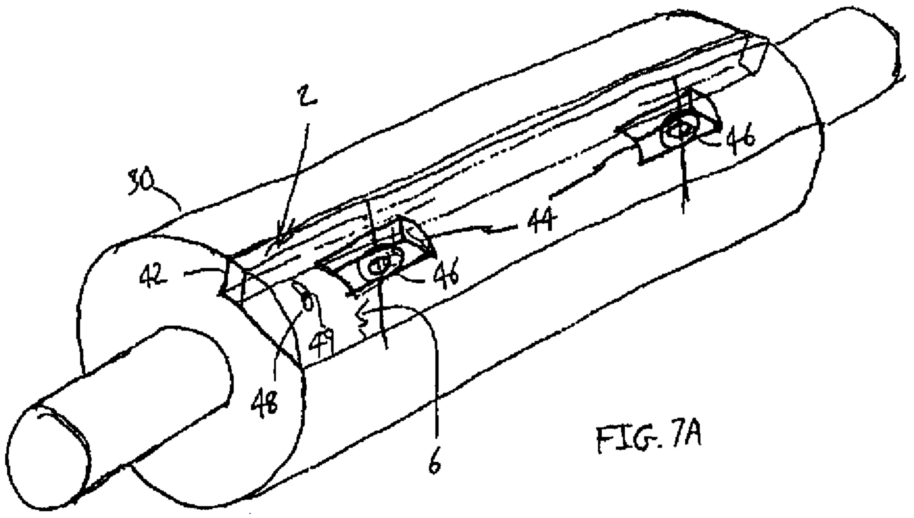

FIG. 7A

"

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 7a should be replaced with the following:

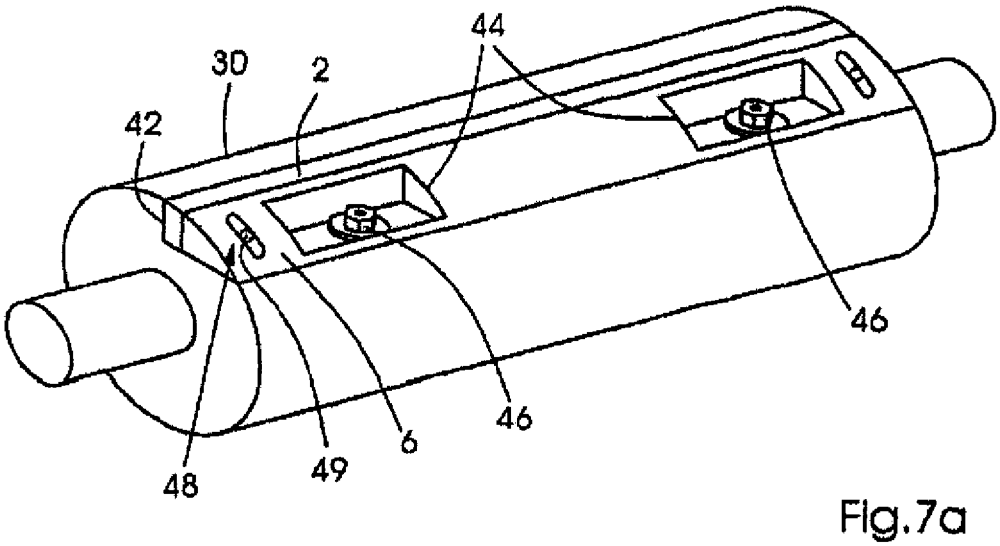

Fig.7a

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 7b should be deleted:

"

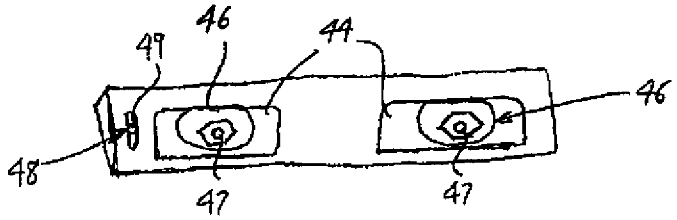

"

FIG. 7B

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 7b should be replaced with the following:

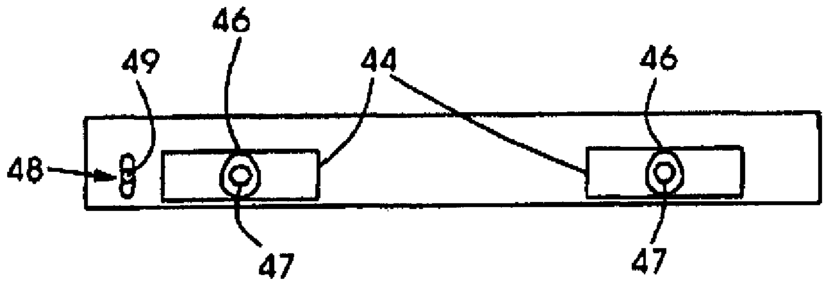

Fig.7b

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 8 should be deleted:

“ 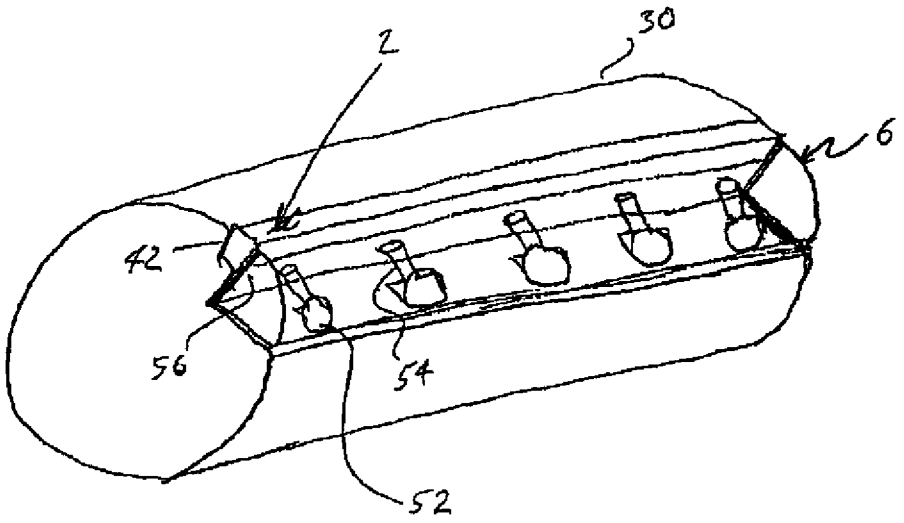 ”

FIG. 8

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 8 should be replaced with the following:

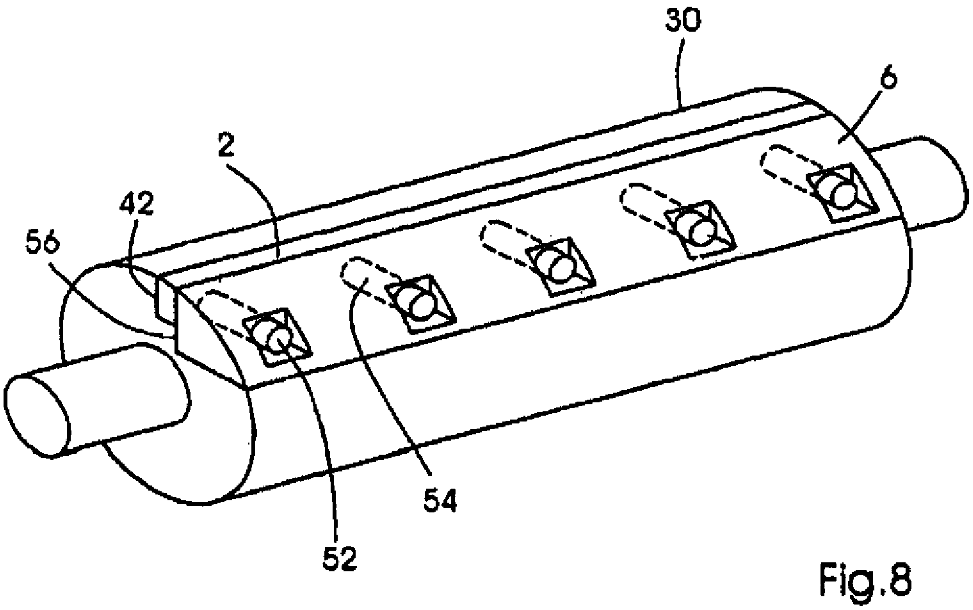

Fig.8

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figures 9a and 9b should be deleted:

“

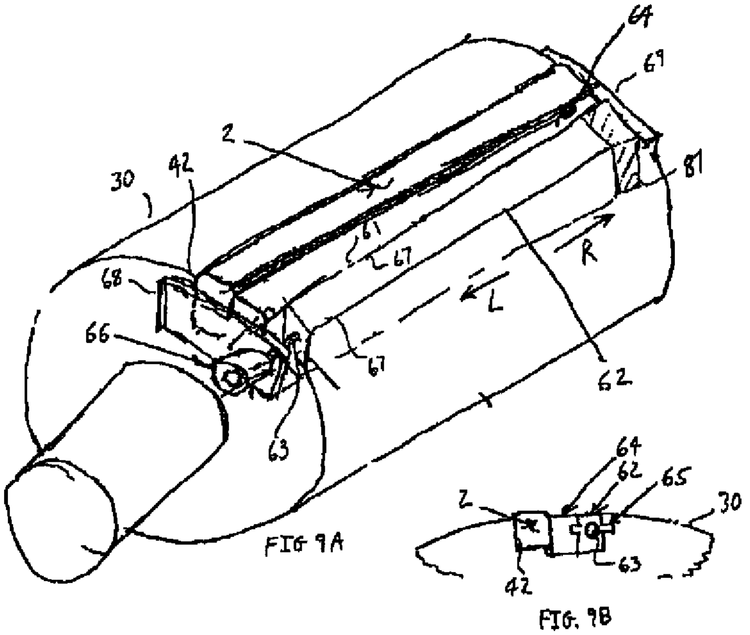

”

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figures 9a and 9b should be replaced with the following:

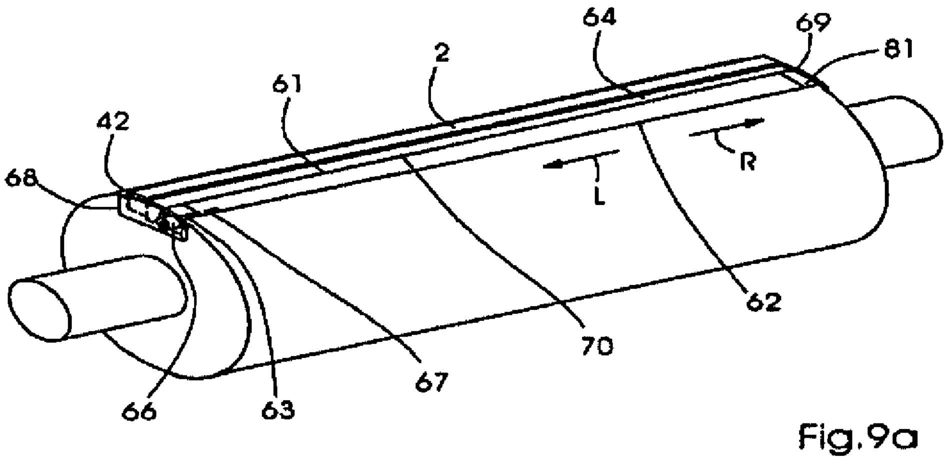

Fig.9a

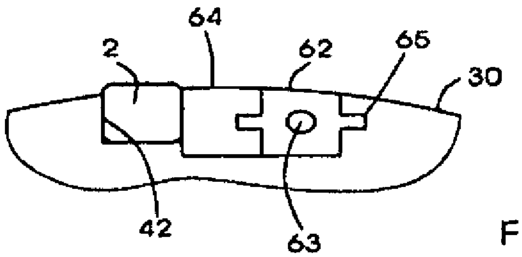

Fig.9b

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 10 should be deleted:

“ 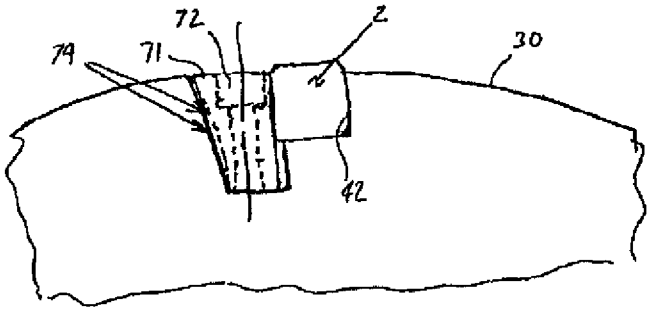 ”

FIG. 10

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 10 should be replaced with the following:

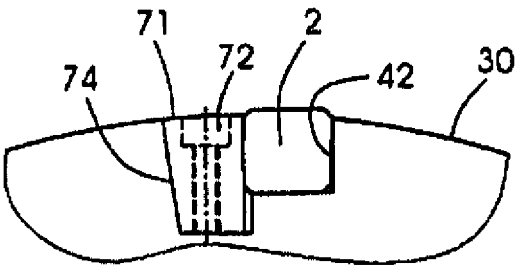

Fig.10

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 11 should be deleted:

"

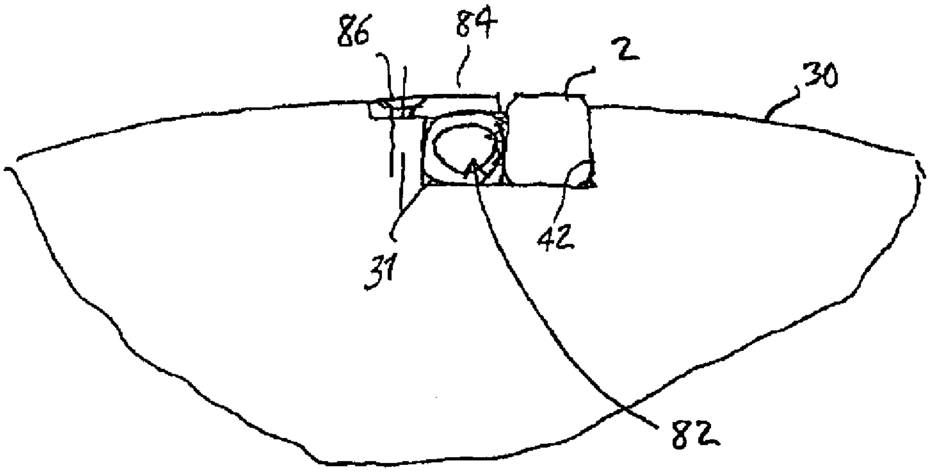

"

FIG. 11

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 11 should be replaced with the following:

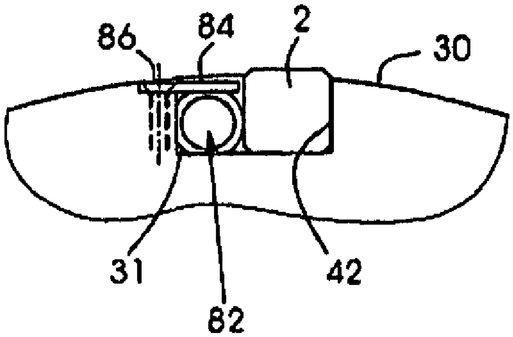

Fig.11

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 12 should be deleted:

“ 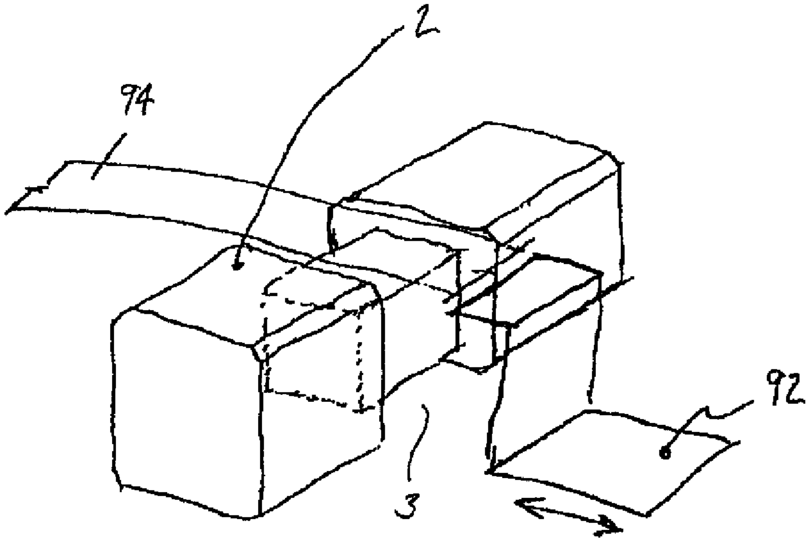 ”

FIG. 12

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 12 should be replaced with the following:

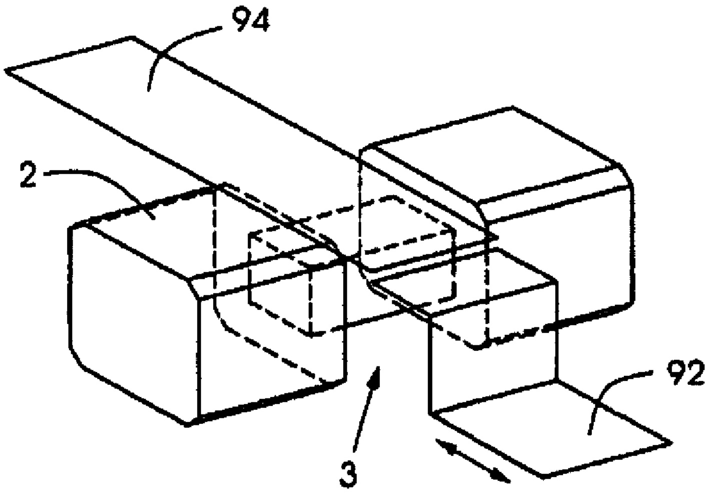

Fig.12

UNITED STATES PATENT AND TRADEMARK OFFICE
CERTIFICATE OF CORRECTION

PATENT NO. : 7,007,580 B2 
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 13 should be deleted:

“

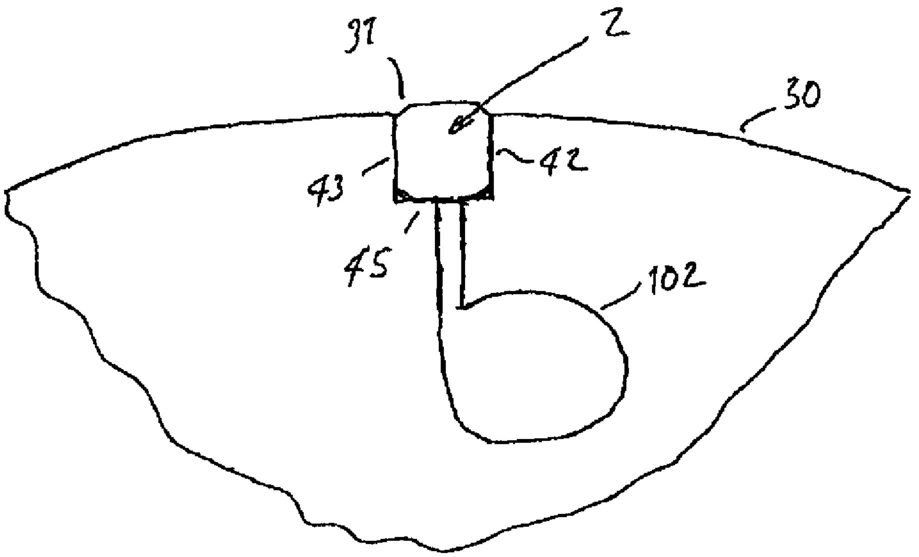

”

FIG. 13

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 13 should be replaced with the following:

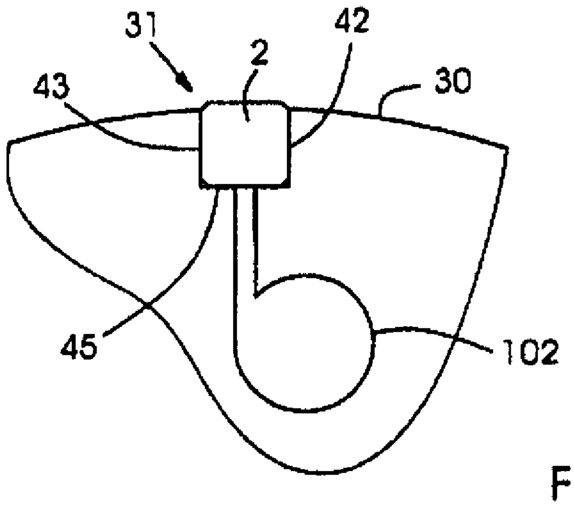

Fig.13

UNITED STATES PATENT AND TRADEMARK OFFICE
CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 14 should be deleted:

“ 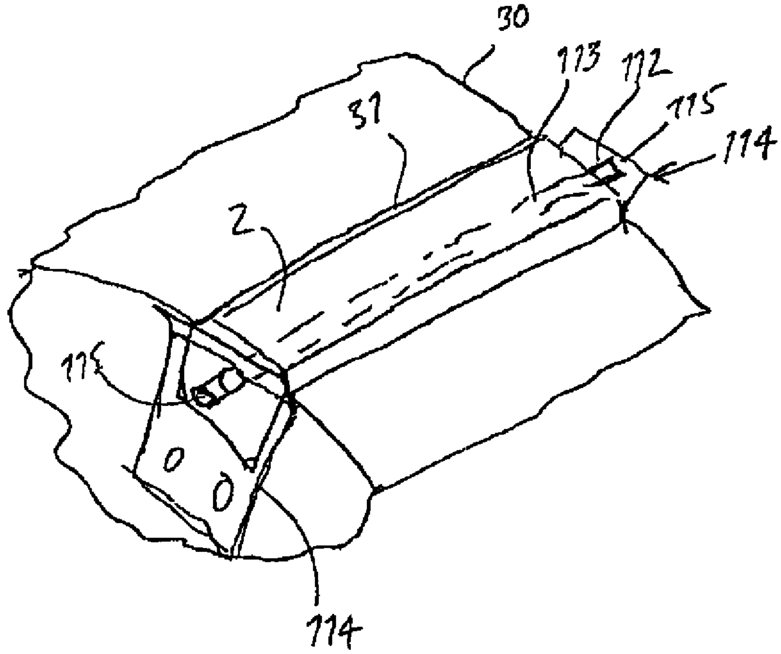 ”

FIG. 14

UNITED STATES PATENT AND TRADEMARK OFFICE

CERTIFICATE OF CORRECTION

PATENT NO. : 7,007,580 B2
APPLICATION NO. : 10/120472
DATED : March 7, 2006
INVENTOR(S) : Hilliard et al.

It is certified that error appears in the above-identified patent and that said Letters Patent is hereby corrected as shown below:

Figure 14 should be replaced with the following:

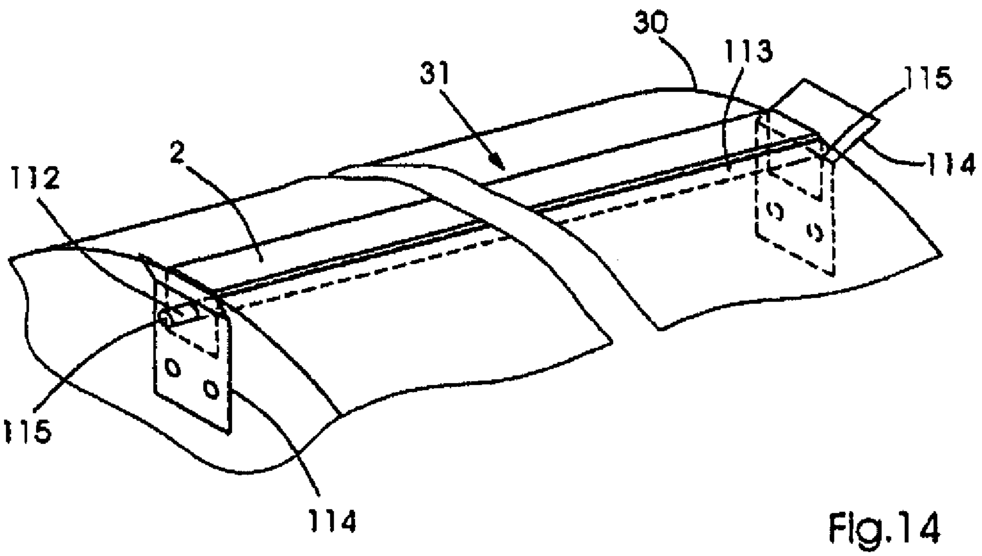

Fig.14